United States Patent Office 3,112,182
Patented Nov. 26, 1963

3,112,182
TRACER FOR INJECTED WATER IN A WATERFLOOD
William O. Brown, Houston, Tex., assignor, by mesne assignments, to Jersey Production Research Company, Tulsa, Okla., a corporation of Delaware
No Drawing. Filed Nov. 17, 1959, Ser. No. 853,459
5 Claims. (Cl. 23—230)

The present invention concerns a method of tracing water injected in a waterflood through underground or subsurface formations.

Injection of water into one or more input wells to displace reservoir oil to one or more producing wells is a well-known procedure for increasing recovery of oil. However, in this process, channeling of water from the injection well or wells to the producing well or wells caused by heterogeneities in the reservoir creates a problem for when channeling occurs, early breakthrough of water in a producing well results which causes excessive water production thereby restricting the rate at which oil can be produced and, in effect, reducing the ultimate recovery of oil. Cycling of water through the channels and lifting of water from the producing well or wells hasten the time when waterflooding becomes unprofitable. Consequently, it is desirable to locate exactly from which injection well or wells the floodwater is channeling so that remedial measures may be taken.

A suitable tracer material for locating wells from which water channels must meet many requirements. These requirements are (1) it must be noncorrosive; (2) it must be safe to handle; (3) it must be readily water soluble; (4) it must be easily detected qualitatively and quantitatively in very small proportions; (5) it must be inexpensive; (6) it must not form precipitates with any of the ions in the reservoir or in the injected water; and (7) it must not be adsorbed on the sands or clays present in the reservoir rock.

I have discovered that a chemical contaninng the orthophosphate anion in the form of $(H_2PO_4)^-$, or $(HPO_4)^{--}$, or $(PO_4)^{---}$ is a tracer material that meets these requirements. The cation may be in the form of mono, di, or tri basic sodium ($Na^+$) or potassium ($K^+$) or any cation that will yield the desired solubility in the injected water. The choice of a particular anion and cation combination will depend upon an evaluation of (1) the solubilities of any reaction products when the tracer chemical is combined with the injected water, (2) the concentration level of the tracer to be injected, (3) the accuracy and detection level of the tracer chemical when produced, and (4) the need for a storage system to permit the use of concentrated water solution of the chemical which is diluted at the point of injection.

The orthophosphate ion is readily detected in concentrations as low as 5 p.p.m. by the yellow color formed when excess sodium molybdate ($Na_2MoO_4$) is added to an acid solution containing orthophosphate ions. Several other suitable tests may be found in chemistry books on colorimetric analysis. The test for higher concentrations can be made quantitative by reading the color intensity on a suitable colorimeter.

To show the adsorption characteristics of the orthophosphate anion on natural rock, the following test was performed:

100 p.p.m. potassium dihydrogen phosphate in formation water was flowed through a small tube packed with sand resulting from crushing a sample of sandstone core. The first few drops of water were collected and these drops showed a positive test for the orthophosphate anion.

To show the application of my discovery in a field operation where it was necessary to know the transit time for water from an injection well to a producing well, the following tests were performed:

The water to be injected was analyzed and found to contain a large amount of calcium ($Ca^{++}$) cations. It was found that the solubilities of calcium (orthophosphate) salts in the injection water were:

| | P.p.m. |
|---|---|
| Tri-calcium orthophophate | 30 |
| Di-calcium orthophosphate | 200 |
| Mono-calcium orthophosphate | 18,000 |

Since the detection level of the orthophosphate anion was found to be 5 p.p.m. and only a qualitative test was desired, an injection concentration of 25 p.p.m., expressed as tri-calcium orthophosphate, was deemed sufficient. Therefore, tri-potassium orthophosphate which has a higher water solubility than the di or mono salt was used to prepare a concentrated (75 percent by weight) solution, which was placed in a thousand gallon storage vessel. 30 gallons per day of this solution were withdrawn and injected with 1500 barrels of water into the water injection well.

Water from the producing well was sampled twice weekly and analyzed for the orthophosphate anion colorimetrically. The sample for the 27th day was blank and the sample for the 31st day indicated 8 p.p.m. of the tracer chemical. Transit time was thereby determined as 28, 29, or 30 days.

The concentration of the orthophosphate anion should be at least as high as the detection level of 5 p.p.m. The preferred concentration range is 20 to 2000 p.p.m. by weight based on the anion.

As illustrated by the laboratory and field tests, the use of the orthophosphate anion tracer will improve control and profitability of artificial water drives.

Having fully described the nature, operation, and objects of my invention, I claim:

1. A method of tracing the flow of water injected in a waterflood of a subsurface hydrocarbon-containing reservoir comprising adding a compound containing an orthophosphate anion to said water injected at one point in said reservoir and testing said water produced from another point in said reservoir for said orthophosphate anion.

2. A method as recited in claim 1 including employing said orthophosphate anion in the flood water in concentrations of the range of 5 to 2,000 p.p.m.

3. A method as recited in claim 2 including testing said produced water by colorimetrically detecting the orthophosphate anion by adding excess sodium molbydate to an acid solution of the produced water.

4. A method as recited in claim 3 including employing in said compound a water-soluble cation with said orthophosphate anion.

5. A method as recited in claim 4 including employing di-potassium as said water-soluble cation.

References Cited in the file of this patent

UNITED STATES PATENTS

| 2,553,900 | Doan | May 22, 1951 |
| 2,578,500 | Bernard | Dec. 11, 1951 |
| 2,868,625 | Frank | Jan. 13, 1959 |

OTHER REFERENCES

Horner: Oil Weekly (1935), July 1, page 29, 30 and 75.
Robinson: Anal. Chem. vol 7 (1935), pages 147 to 150.
Farber: Ibid; vol 4, 1932, page 107 to 109.